July 7, 1942. A. L. BEALL ET AL 2,289,233
JOURNAL BEARING
Filed March 8, 1940
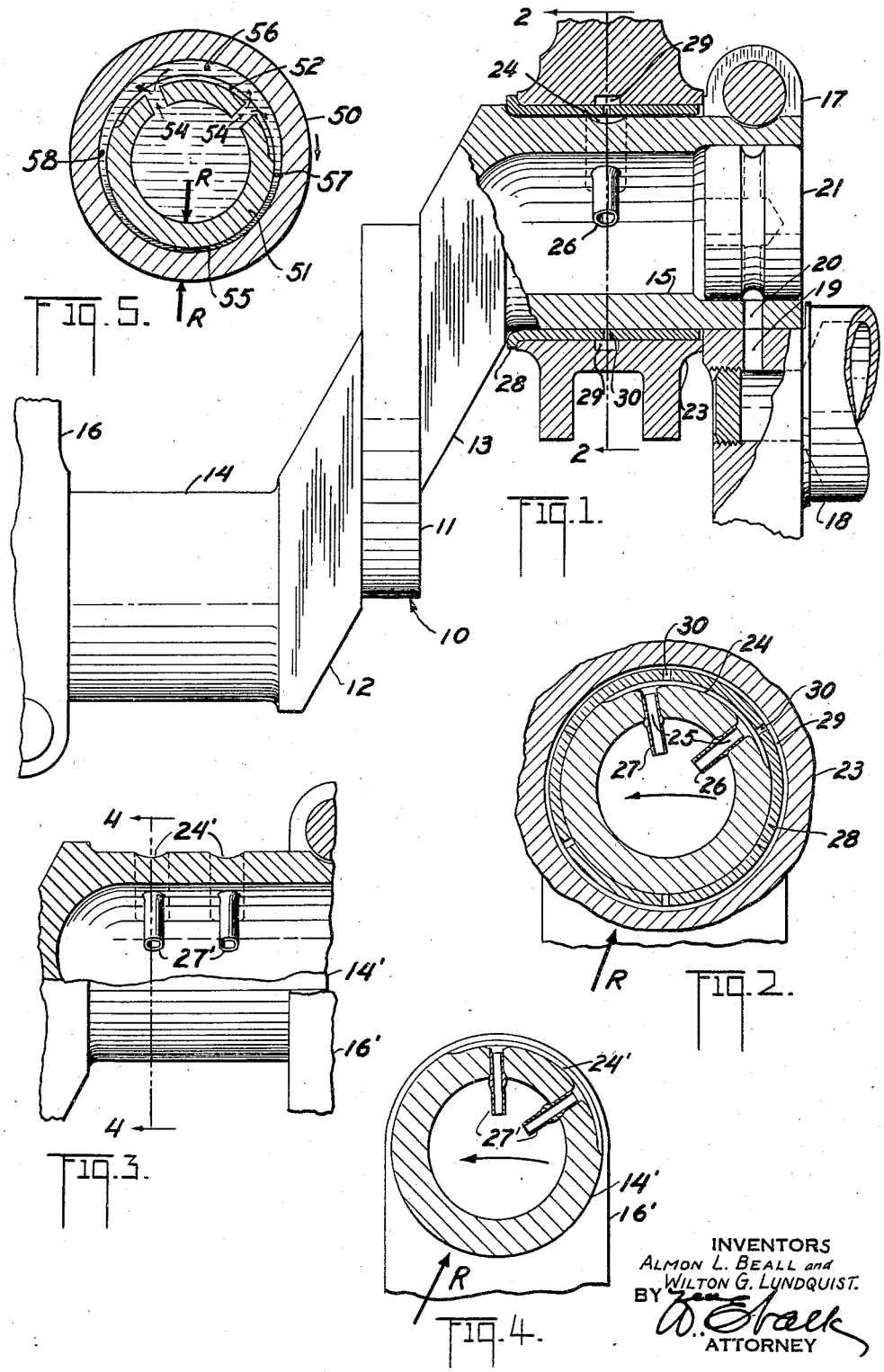
INVENTORS
ALMON L. BEALL and
WILTON G. LUNDQUIST.
BY
ATTORNEY Patented July 7, 1942

2,289,233

UNITED STATES PATENT OFFICE 2,289,233

JOURNAL BEARING

Almon L. Beall, Ridgefield, and Wilton G. Lundquist, Hohokus, N. J., assignors to Wright Aeronautical Corporation, a corporation of New York Application March 8, 1940, Serial No. 322,890

14 Claims. (Cl. 184—6)

This invention relates to the lubrication of bearings and is particularly concerned with improvements in the arrangement of oil grooves and channels in journal and bearing members to the end that full film lubrication is maintained in the bearing during operation.

The invention is developed particularly for use in connection with crankpin-connecting rod bearings in internal combustion engines but its provisions are not necessarily restricted to this use.

In radial cylinder aircraft engines wherein the pistons of a plurality of cylinders are articulately connected to a main bearing member journalled upon a crankpin, the resultant force on the crankpin, under fairly high rotational speeds, always acts in an outward direction so that the bearing load is dominantly on the inside of the crankpin. Thus, the inside of the crankpin is subject to the most wear, whereas the outside of the crankpin is subjected to little wear due to the relatively low bearing pressures thereon. In order to lubricate such a bearing it has been conventional practice to utilize the crankshaft as an oil distributing header, and lubricant from the interior of the crankpin is fed to the connecting rod-crankpin bearing through a hole drilled in the pin. If this hole be on the inside of the crankpin, lubricant is fed to the high pressure zone of the bearing, while if the hole is on the outside of the crankpin, lubricant is fed to the low pressure zone of the bearing. The latter arrangement is preferable but, as previously implied, has limitations in that there is insufficient orifice area for oil delivery to maintain the bearing full of oil. The orifice area mentioned, in effect, is the bearing clearance times the periphery of the orifice and this, obviously, is very small compared with the orifice area at the ends of the bearing through which lubricant in the bearing may bleed. Although there is a substantial pressure drop from the oil feed orifice, which is under engine oil pressure, to the bearing ends, the feed orifice area is wholly inadequate to maintain the bearing full of oil.

It is to be understood that the unit bearing pressure is many times greater than the oil feed pressure, and that, so long as the bearing is kept full of oil, the film is worked between the bearing elements at the high pressure zone by fluid drag and natural creep of the lubricant due to its low surface tension.

It is an object of this invention to provide an oilfeed orifice arrangement whose effective area is large whereby the bearing may be kept full of oil.

It is a further object of the invention to provide oilfeed means to a bearing which shall not interfere with the effective area of the loaded side of the bearing and further, to provide means by which oil entering the bearing at the feed orifice may be carried in a bearing reservoir under engine oil pressure for distribution to the low pressure side of the bearing by which the oil may be carried to the loaded zones thereof without bleeding to such an extent that partial film lubrication would result.

The invention is to be considered in connection with bearings which are in a critical zone of lubrication which may be made clear by the following example:

In high output aircraft engines, connecting rod bearing lubrication is ordinarily limited by high engine R. P. M. as obtained during dive of the airplane. Experiments on a particular engine determine the maximum safe R. P. M. at which the engine can be operated, and the conventional connecting rod bearing lubrication has usually required a limitation on engine speed at about 3,000 R. P. M. On engines incorporating the provisions of this invention, it was found that the safe speed could be rated at 3,500 R. P. M. which appears at the moment to be the maximum speed which may be required. However, no failure of the connecting rod bearing resulted at 3,500 R. P. M. and the limiting speed for the bearing has not yet been determined.

It is appreciated that bearing grooves per se, are old in the art, but it is believed that grooves have not been used in the particular manner here disclosed, for the same purpose.

For a better understanding of the details of the invention, reference may be made to the detailed description herewith in connection with the drawing, in which:

Fig. 1 is a fragmentary side elevation, partly in section, of a crankshaft provided with a bearing;

Fig. 2 is a section on the line 2—2 of Fig. 1;

Fig. 3 is a fragmentary sectionalized view of a crankpin showing an alternative arrangement of the invention;

Fig. 4 is a section on the line 4—4 of Fig. 3; and

Fig. 5 is a section through a journal bearing showing clearances and oil film greatly exaggerated.

Referring first to Figs. 1 and 2, 10 shows a crankshaft equipped with a center journal 11 integral with opposed crankcheeks 13 carrying integral crankpins 14 and 15 which are respectively clamped in cheeks 16 and 17 having integral crankshaft journals one of which is shown at 18. Oil is fed through the hollow journal 18 to cooperating drillings 19 and 20 to a crankpin plug 21 having appropriate openings for conducting the oil to the hollow crankpin 15; corresponding drillings being provided for conducting oil to the hollow of the crankpin 14. The crankpins are embraced by master connecting rods one of which is shown at 23, this rod having connected thereto a plurality of articulated rods in the conventional manner. As shown in Fig. 2, the vector R indicates the average direction of the resultant force imposed on the crankpin by the rod assembly whereby the pressure zone on the crankpin occupies an arcuate area of about 145°, the center of which arc is coincidental with the vector R which passes along that radius of the crankpin which is rotationally in advance of the crankarm axis, but which acts predominantly in an outward direction. The direction of action of R varies with speed and the ends of the groove shortly to be described must be arranged to be short of any high pressure bearing zone encountered during operation. The outer portion of the crankpin is relatively unloaded and in this zone the pin is provided with a segmental oil groove 24 whose arcuate extent is something less than 180° and whose center is on the line of action of the vector R.

The groove 24 extends circumferentially of the crankpin and is of sufficient width and depth to readily conduct oil from the oil feed holes 25 and 26 along the whole of the groove. To feed the groove 24 most readily, the holes 25 and 26 into the crankpin hollow, are disposed about one-fourth of the groove length from each end thereof so that the hole 25 feeds the forward half of the groove and the hole 26 feeds the rearward half of the groove, the terms "forward" and "rearward" being with respect to the direction of travel of the crankpin. The holes 25 and 26 are both provided with tubes 27 extending into the crankpin hollow which serve, in a manner well known in the art, as means to prevent heavy foreign matter in the oil from entering the bearing.

The connecting rod 23 carries, rigidly therewith, a bearing bushing 28 and the center of the connecting rod is formed with an annular groove 29 open to a plurality of radial drillings 30 in the bearing shell 28. At least one of the drillings 30 will at all times be in free communication with the oil groove 24 and, since oil pump pressure obtains in the groove 24, oil will be forced under pump pressure to fill the annular groove 29 by which oil may be delivered through one or more of the holes 30 to any part of the space between the crankpin and the bearing where the oil pressure may be less than pump pressure as a result of leakage of oil from the bearing or other cause. Thus, the groove 24 primarily, and the annulus 29 secondarily, provide means for keeping the whole bearing full of oil at least at pump pressure under all conditions of operation to the end that oil bleed from the bearing ends will not be in excess of oil fed to the bearing, whereby a full lubricating film is maintained. The peripheral length of the groove 24 times whatever bearing clearance there may be, represents the area through which pump pressure oil may be fed to the bearing, whereas in the prior art this area was highly restricted in virtue of the small periphery of the usual single oil hole from which the bearing was fed. Sufficient oil could not be fed to the bearing under pump pressure through this small area to make up for the oil bleed at the bearing ends, therefore full lubrication could not be maintained at high speed. The high speed condition tends to augment the oil bleed from the bearing to a high degree and to an extent with which the oil feed could not keep pace. In the arrangement described, however, the comparatively large area for oil feed allows the amount of oil feed to keep pace with the bleed to the end that perfect lubrication is obtained.

The primary improvement afforded by the invention lies in the oil groove 24 and the ample oilfeed thereto and this arrangement, without the annulus 29 and the drillings 30 affords bearing performance not previously obtainable. The addition of the annulus 29 and the drillings 30 provide a still further improvement in allowing high speed bearing operation.

Figs. 3 and 4 show an alternate arrangement of the invention in which two parallel grooves 24' are disposed in side by side relation on the crankpin journal, respective grooves being fed as before from tubes 27 leading to the hollow of the crankpin. In this arrangement, nearly twice the amount of oil can be fed to the bearing since the peripheral length of the grooves, as well as the effective area of the oilfeed holes, is doubled. However, twice the performance of the previous arrangement need not necessarily be expected from the alternate arrangement since the path of travel from the outer borders of respective grooves to the bearing ends is less than before and accordingly a greater oil bleed would be expected from the bearing ends.

Fig. 5 will assist in showing the way in which the teachings of the invention provide improved bearing lubrication. The bearing is indicated at 50 and is presumed to rotate clockwise with respect to a fixed journal 51, the load between bearing and journal being applied as represented by the vectors R. The top part of the journal is provided with the oil feed groove 52 fed from holes 54 in the manner previously described. Due to bearing load, the journal and bearing will be slightly eccentric as shown, the thin gap therebetween being designated at 55 at which pressure zone the pressure within the lubricating oil must be equal to the pressure between the bearing elements. Above the zone 55 in the region of the oil groove 52, at 56, there will be a relatively large clearance zone, into which the oil may be fed at comparatively low pressure. The entering wedge for oil entrainment between the pressure surfaces is shown at 57 and it is apparent, in order to obtain perfect lubrication, that this region must be full of oil—so full, in fact, that lubricant will be issuing from the ends of the bearing so that, as the oil is compressed between the bearing surfaces, further throw-off of lubricant will obtain at the bearing ends throughout the pressure zone 55. Now, at the end of the pressure zone, indicated at 58, it will be apparent that as the clearance increases, there will be insufficient oil left from the pressure zone 55 to fill this clearance space and there will be a lack of fullness in the bearing until such time as oil is fed thereto. In virtue of the groove 52, oil under pump pressure is conducted to the zone 58 and throughout the large clearance zone 56 to the wedge zone 57 in sufficient quantity so that filling of the bearing is assured throughout by establishing end bleed from the bearing (not only in the pressure zone where the oil is squeezed out but also at the clearance zones where the oil is forced from the bearing by oil pump pressure). Thus, by the continuous bleed of oil from the clearance zones of the bearing, full assurance is given that there will be adequate oil in the wedge zone 57 to provide full film lubrication in the pressure zone 55.

Comparing this with prior practice, zones such as 56 and 58 were not filled with oil, and oil under pump pressure was directed to the zone 57 or immediately ahead thereof in the hope that sufficient oil would be fed to give full film lubrication in the pressure zone. That this hope was not realized is indicated by the above quoted example where bearings according to prior practice have limiting speeds of about 3,000 R. P. M. whereas bearings incorporating the teachings of the invention have run without sign of failure up to about 3500 R. P. M. at which speed the centrifugal loads on the bearing are much higher than at lower speeds. This leads to the conclusion that the low pressure zone in the bearing was not previously provided with a sufficient amount of oil to insure full bleeding at the bearing ends and full film lubrication in the pressure zone.

In systems of the character disclosed, a large amount of oil flow through the bearing is desirable since this flow establishes a definite cooling system for the bearing surfaces whose unit loading under operating conditions is high. This distinguishes bearings of this character from those which are operated under fully submerged conditions where full film lubrication may be definitely assured but where no definite flow of lubricant is established through the bearing for cooling the internal portions thereof.

While we have described our invention in detail in its present preferred embodiment, it will be obvious to those skilled in the art, after understanding our invention, that various changes and modifications may be made therein without departing from the spirit or scope thereof. We aim in the appended claims to cover all such modification and changes.

We claim:

1. In a lubricating system for a journal and bearing wherein the load on the journal is applied predominantly along a certain radius thereof, a segmental oil groove in the journal disposed on the opposite side thereof from the loaded zone, and means to feed oil to said groove through the journal, the groove providing oil feed to a large area on the unloaded journal side whereby part of the oil may flow to the bearing ends from the groove with substantial cooling effect and inconsequential lubricating effect at the unloaded zone of the bearing, and whereby part of the oil enters the loaded bearing zone to provide lubrication therefor.

2. In a crankpin-connecting rod assembly, the pin comprising a journal, a segmental oil groove on the journal extending from a point substantially 30° ahead, rotationally, of the crank arm axis to a point substantially 90° behind the crank arm axis, and means for feeding oil from within the journal to a plurality of points along said groove.

3. A crankshaft comprising a main journal and a hollow oil receiving crankpin journal, said crankpin having a central groove in the outer part thereof which has an arcuate embracement of less than a semicircle, the center of the embracement arc lying rotationally rearward of a crank arm axis, and said pin having oil feed ducts from the hollow to the groove substantially bisecting the forward and rearward groove halves.

4. A crankshaft comprising a main journal and a hollow oil receiving crankpin journal, said crankpin having a central groove in the outer part thereof which has an arcuate embracement of less than a semicircle, the center of the embracement arc lying rotationally rearward of a crank arm axis, and said pin having oil feed ducts from the hollow to the groove substantially bisecting the forward and rearward groove halves, said groove being disposed circumferentially of the crankpin and substantially midway between the crankpin journal ends.

5. In a journal and bearing assembly having running clearance whereby substantially annular orifices exist at each end of the bearing, means to feed oil under pressure to the unloaded side of the bearing substantially midway of the ends thereof, said means comprising a circumferentially extending groove on the journal surface providing oil inlet orifices, the periphery of said groove being of such magnitude as to allow of inlet flow of oil to the bearing greater than the exit flow from the bearing ends whereby part of said oil flows to the bearing ends without traversing the loaded zone of the bearing while another part of said oil is entrained for lubrication of the loaded zone of the bearing.

6. In a bearing assembly comprising a journal member and a bearing, the journal member being predominantly loaded in a certain zone whereby the clearance is small at said zone and relatively large at the side opposite said zone, an oil distributing groove in said member extending circumferentially thereof and terminating short of said loaded zone, and means to feed lubricant to said groove under pressure whereby part of said oil flows to the bearing ends without traversing the loaded zone of the bearing while another part of said oil is entrained for lubrication of the loaded zone of the bearing.

7. In a bearing assembly comprising a journal member and a bearing, the journal member being predominantly loaded in a certain zone whereby the clearance is small at said zone and relatively large at the side opposite said zone, an oil distributing groove in said member extending circumferentially thereof and terminating short of said loaded zone, and means to feed lubricant to said groove under pressure less than the bearing pressure but great enough to establish cooling oil flow through the unloaded zone of the bearing assembly for oil bleed at the bearing ends.

8. In a bearing assembly comprising a journal member and a bearing, the journal member being predominantly loaded in a certain zone whereby the clearance is small at said zone and relatively large at the side opposite said zone, an oil distributing groove in said member extending circumferentially thereof and terminating short of said loaded zone, and means to feed lubricant to said groove under pressure to establish cooling oil flow through the bearing assembly for bleed at the bearing ends, the journal member being further characterized by having a continuous uninterrupted bearing surface throughout its loaded zone.

9. In a bearing assembly comprising a journal element and a bearing element one of which is predominantly loaded in a certain zone whereby the clearance at said zone tends to be small, an oil duct in said one element extending therethrough to the unloaded zone thereof, means to supply fresh lubricant continuously to said duct for bleed longitudinally of the unloaded zone for filling and cooling the bearing, and means to supply fresh lubricant to the unloaded zone close to the beginning of the loaded zone which lubricant is entrained between the elements for bearing lubrication.

10. In a bearing assembly subject to end leakage of lubricant comprising a journal element and a bearing element one of which is predominantly loaded in a certain zone and is unloaded in the opposite zone, the loaded zones of both elements being uninterrupted to provide maximum possible bearing area, means to feed an excess supply of fresh lubricant continuously to the unloaded zone for endwise cooling flow therethrough and to maintain the unloaded zone completely filled with oil, a portion only of said oil supply, adjacent the threshold of the loaded zone, being carried into the loaded zone for lubrication thereof.

11. In a bearing assembly subject to end leakage of lubricant comprising a journal element and a bearing element one of which is predominantly loaded in a certain zone and is unloaded in the opposite zone, the loaded zones of both elements being uninterrupted to provide maximum possible bearing area, means to feed an excess supply of fresh lubricant continuously to the unloaded zone for endwise cooling flow therethrough and to maintain the unloaded zone completely filled with oil, said means comprising a groove in the predominantly loaded element substantially coextensive in angular extent with the unloaded zone, and devices to feed oil to a plurality of points along said groove, a portion only of said oil supply, adjacent the threshold of the loaded zone, being carried into the loaded zone for lubrication thereof.

12. In a crankpin-connecting rod assembly wherein the pin comprises a journal and the rod comprises a cylindrical bearing having an uninterrupted surface, a segmental groove on the journal subtending substantially a semicircle and disposed on the most remote side of the journal from the crank axis, and means to feed lubricant to said groove.

13. In a crankpin-connecting rod assembly wherein the pin comprises a journal and the rod comprises a cylindrical bearing having an uninterrupted surface, a segmental groove on the journal subtending substantially a semicircle and disposed on the most remote side of the journal from the crank axis, an oil conduit within the journal, and means to feed lubricant from said conduit through the journal wall to a plurality of points along said groove.

14. In a crankpin-connecting rod assembly wherein the pin comprises a journal and the rod comprises a cylindrical bearing having an uninterrupted surface, a segmental groove on the journal subtending substantially a semicircle and disposed on the most remote side of the journal from the crank axis, an oil conduit within the journal, and means to feed lubricant from the conduit to the grooves close to both ends of the groove.

ALMON L. BEALL.
WILTON G. LUNDQUIST.